United States Patent [19]

Musso

[11] Patent Number: 4,621,933

[45] Date of Patent: Nov. 11, 1986

[54] LINE SPACING MECHANISM FOR PRINTING MACHINES

[75] Inventor: Pietro Musso, Ivrea, Italy

[73] Assignee: Ing. C. Olivetti & C., S.p.A., Ivrea, Italy

[21] Appl. No.: 651,317

[22] Filed: Sep. 17, 1984

[30] Foreign Application Priority Data

Sep. 29, 1983 [IT] Italy ............................ 68001 A/83

[51] Int. Cl.[4] .................... B41J 19/96; B41J 19/14; F16H 55/18; F16H 1/16

[52] U.S. Cl. .................................. 400/555; 400/551; 400/567; 400/564; 74/409; 74/425

[58] Field of Search ............... 400/545, 551, 555, 560, 400/567, 568, 569, 564; 74/409, 425

[56] References Cited

U.S. PATENT DOCUMENTS

| | | | |
|---|---|---|---|
| 2,173,660 | 9/1939 | Perkins | 74/409 X |
| 3,339,426 | 9/1967 | Borggrafe | 74/425 |
| 3,387,081 | 6/1968 | Kleinschmidt et al. | 400/568 X |
| 3,848,477 | 11/1974 | Giandinoto et al. | 74/425 |
| 3,866,486 | 2/1975 | Lechner | 74/425 |
| 3,888,340 | 6/1975 | Hoffman | 400/902 X |
| 3,915,281 | 10/1975 | Blomquist et al. | 400/569 |
| 4,040,307 | 8/1977 | Koster | 74/425 |
| 4,112,344 | 9/1978 | Klein | 400/902 X |

FOREIGN PATENT DOCUMENTS

| | | | |
|---|---|---|---|
| 139411 | 5/1985 | European Pat. Off. | 400/567 |
| 38186 | 3/1983 | Japan | 400/568 |
| 138675 | 8/1983 | Japan | 400/568 |

OTHER PUBLICATIONS

IBM Tech. Disc. Bulletin, "Electromechanical Variable-Index System", Klein, vol. 17, No. 4, Sep. 1974, pp. 959-960.

Primary Examiner—Edgar S. Burr
Assistant Examiner—James R. McDaniel
Attorney, Agent, or Firm—Banner, Birch, McKie & Beckett

[57] ABSTRACT

A line spacing mechanism for printing machines comprises an electric motor which is operable to rotate selectively in either direction. A worm on the shaft of the motor meshes with a helicoidally toothed wheel to cause a platen roller to rotate in the clockwise direction or the anticlockwise direction. The motor is support pivotally by trunions and urged by a spring to eliminate radial play between the worm and toothed wheel. Another spring, lever and ball apply thrust to the motor shaft to take up axial play in its bearing, i.e. between the worm and the motor.

7 Claims, 3 Drawing Figures

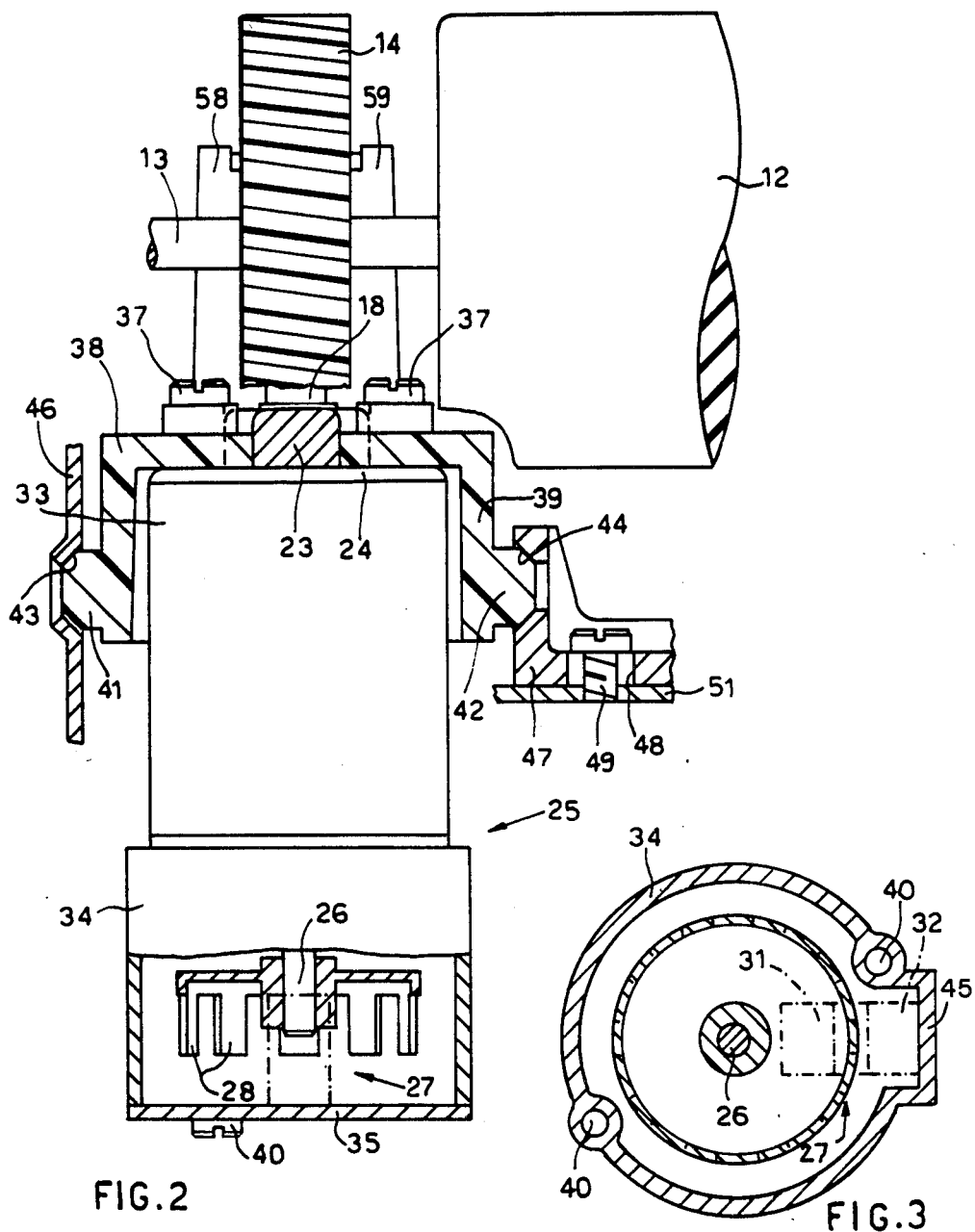

LINE SPACING MECHANISM FOR PRINTING MACHINES

BACKGROUND OF THE INVENTION

The present invention relates to a line spacing mechanism for printing machines, in particular for typewriters.

In known mechanism, the line spacing movement of a platen roller is produced by a ratchet arrangement connected to a coupling actuated directly by the motor of the machine. The roller is held firmly at predetermined positions by suitable spring-detent positioning means. Such a construction is found to be expensive and does not permit easy movement in both directions of the platen roller or the possibility of positioning with micrometer accuracy.

SUMMARY OF THE INVENTION

An object of the present invention is therefore to provide a line spacing mechanism which is simple, reliable and moderate in cost and which permits positioning of the platen roller with micrometer accuracy. The present invention accordingly provides a line spacing mechanism for a printing machine wherein a line spacing mechanism for a printing machine comprising a platen having a toothed wheel connected with the platen, a worm engaged with the toothed wheel to produce the rotary movement of the platen, an electric motor having a rotor which rotates said worm, and play take-up means which operate on the worm to reduce the play between the worm and the toothed wheel.

BRIEF DESCRIPTION OF THE DRAWING

The invention will now be described, by way of example, with reference to the accompanying drawing, in which:

FIG. 2 is a front view of the part of the machine shown in FIG. 1, and

FIG. 3 is a view in section of some details of FIG. 1.

DESCRIPTION OF A PREFERRED EMBODIMENT

Figure 1:
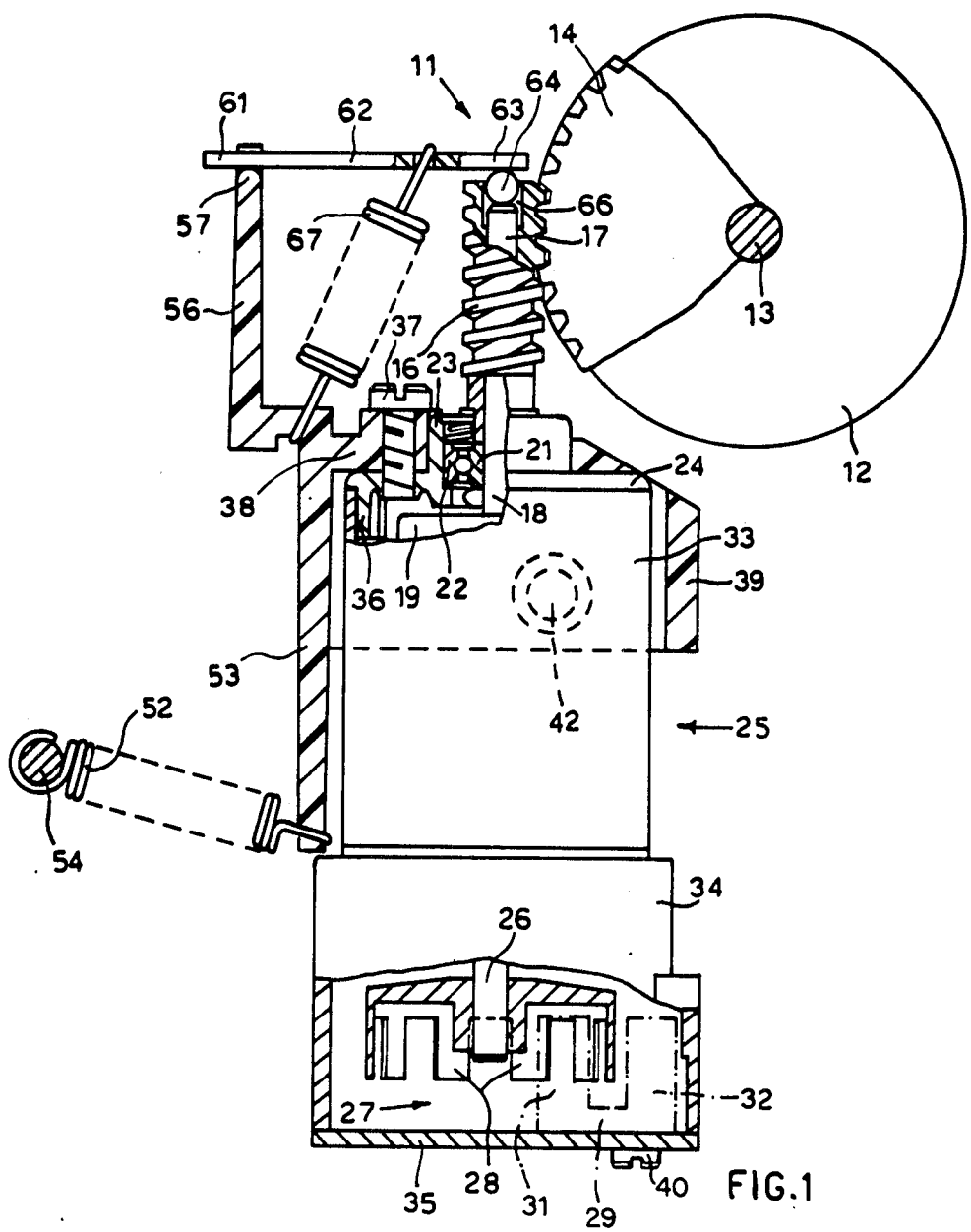
FIG. 1 is a side view of part of a typewriter.

In the embodiment described herein, the line spacing mechanism 11 is applied to a typewriter having a normal platen roller 12 which is fixed on a shaft 13. A helicoidally toothed wheel 14 which is fixed with respect to the platen 12 is always engaged with a worm 16 which is fixed on an end 17 of a shaft 18 of a direct current motor 19. The motor 19 is a normal direct current motor and will thus not be described and illustrated in detail.

The shaft 18 is mounted on a ball bearing assembly whose inner race 21 is fixed on the shaft 18, while the outer race 22 is mounted within a sleeve portion 23 of a cover 24 of a container 25. Mounted on the other end 26 of the shaft 18, which projects from the rotor of the motor 19, is a coder 27, having a series of sectors 28. An optical transducer 29 comprises a light 31 and a photo detector 32 which are disposed on opposite sides with respect to the path of movement of the sectors 28. During the rotary movement of the shaft 26, the sectors 28 pass between the light 31 and the photodetector 32, signalling to the control circuits of the machines the incremental rotary movements of the shaft 26, in per se known manner. The motor 19 and the coder 27 are mounted as a single unit housed within the container 25.

The speed and the positioning of the rotor of the motor 19 are controlled by a device of the type described in published European patent application No. 0 102 248 and will therefore not be described in detail herein.

The container 25 comprises two hollow cylindrical portions 33 and 34 which are fixed together to house the direct current motor 19 and the coder 27. The container 25 is closed in its upper portion by the cover 24 which is fixed with respect to the internal wall surface by means of a sleeve portion 36 and is closed in its lower part by a cover 35 which is fixed in position by means of screws 40.

In the vicinity of the cover 35, the cylindrical portion 34 has a housing 45 (see FIG. 3) of rectangular section, for housing the photodetector 32 of the coder 27 (see FIG. 1). The container 25 is fixed by means of the cover 24 and screws 37 to a plate 38 of a support 39 which can oscillate in the clockwise and anticlockwise directions in FIG. 1. The support 39 comprises a cylinder having a hollow interior for housing the cover 24 and the upper part 33 of the container 25. The support 39 has two trunions 41 and 42 (FIG. 2) which are coaxial with each other and project externally from the support and are housed in two seats 43 and 44 of a frame structure 46 and an adjustable support 47 respectively. The support 47 is mounted adjustably with respect to the frame structur 51 of the machine by means of a slot 48 and a screw 49 to permit better positioning of the portions 41 and 42 with respect to the seats 43 and 44, and the worm 16 with respect to the toothed wheel 14. A spring 52 (see FIG. 1) is tensioned between a limb 53 of the support 39 and a fixed stop 54 of the machine and produces clockwise rotation of the support 39 with the container 25, the motor 19, the coder 27 and the worm 16 until the worm 16 is fully meshed with the helicoidally toothed wheel 14 in such a way that there is no radial play between the worm 16 and the toothed wheel 14.

The support 39 comprises another limb 56 which projects from the plate 38, with the end 57 thereof being rounded and flanked by two side projections 58 and 59 (FIG. 2). An end 61 of a blade 62 of substantially rectangular shape normally bears against the rounded end 57 (see FIG. 1). The other end 63 of the blade 62 is normally supported on a ball 64 housed in a cylindrical seat 66 in the worm 16 and lodged against the end 17 of the shaft 18 in such a way that the ball 64 projects from the upper end of the worm 16.

A spring 67 is tensioned between the plate 38 and the blade 62 urges the blade in a clockwise direction in FIG. 1, whereby the end 63 of the blade urges the ball 64 and thus the shaft 18 towards the lower cover 35 of the container 25. That axial movement of the shaft 18 continues until the shaft 18, with the internal race 21, has taken up all the axial play with respect to the external race 22, taking up any axial play between the two races 21 and 22.

It will be apparent therefore that, in the line spacing mechanism 11 according to the invention, the spring 52 can rotate the motor unit 19 together with the coder unit 27 and the worm 16 to take up and thus eliminate the play between the worm 16 and the helicoidally toothed wheel 14 and the spring 67 can rotate the blade 62 which urges the ball 64 and the shaft 18 in such a way as to take up and thus eliminate the axial play of the worm 16 with respect to the support of the motor 19.

That structure makes it possible to achieve micrometric movements of the platen 12, with a high degree of accuray, the pitch of the movements of the platen 12 being proportional to the pitch of the sectors 28 of the coder 27. The transmission ratio between the screw 16 and the wheel 14 is such that a movement of 2 mm at a sheet of paper carried by the platen 12 corresponds to one revolution of the screw. By using a decoder 27 provided with ten sectors 28, it is thus possible to obtain, on the sheet of paper, a minimum line spacing movement of 0.1 mm in response to an incremental rotation of 1/20th of a revolution. The provision of the play take-up means makes it possible to produce those movements repetitively and with a high degree of accuracy.

It will be clear that alternatively the screw 16 can be suitably actuated for rotation thereof by a stepping motor, without using any position indicator.

Particular advantages have been achieved by using the control means described in the present applicants' Italian patent application No. 67938-A/83 filed on Sept. 12, 1983, for actuation of the motor 19.

What we claim is:

1. A line spacing mechanism for printing machine comprising a platent having a helicoidally toothed wheel connected coaxially with the platen, a worm engageable with the helicoidally toothed wheel to produce the rotary movement of the platen, an electric motor including a motor shaft which rotates the worm, a coder unit for controlling the angular position of the worm, the motor shaft comprising a first end on which is fixed the worm and a second end on which is fixed the coder unit, wherein the worm is disposed opposite to the coder unit and the electric motor is disposed between the worm and the coder unit, a container for housing the electric motor and the coder unit and wherein the worm projects from the container, a pivotable support in which is mounted said container, pivot means disposed parallel to the platen for pivotally mounting said pivotable support, and means for taking-up radial play and axial play for holding the worm engaged with the helicoidally toothed wheel, said means for taking-up radial play and axial play comprising first spring means for pivoting the pivotal support about said pivot means until the worm is fully meshed with the helicoidally toothed wheel so as to reduce the radial play between the worm and the helicoidally toothed wheel and second spring means operative on said worm and on said first end as to reduce the axial play between the worm and the container.

2. A line spacing mechanism according to claim 1, wherein said pivot means comprise two trunions of the pivotable support which are coaxial with each other and project externally from the pivotable support, and a pivoting structure comprising two seats for housing the two trunions, and wherein said first spring means comprise a spring which is tensioned between the pivotal support and a fixed stop, and said spring urges the pivotable support to pivot abut the trunions in the sense forcing the worm into mesh with the helicoidally toothed wheel without radial play between the worm and the helicoidally toothed wheel.

3. A line spacing mechanism according to claim 2, wherein said pivoting structure comprises a frame structure and an adjustable support, wherein the adjustable support is mounted adjustably with respect to the frame structure to enable better positioning of the trunions with respect to said seats and the worm with respect to the helicoidally toothed wheel.

4. A line spacing mechanism for a printing machine comprising a platen having a helicoidally toothed wheel connected coaxially with the platen, a worm engageable with the helicoidally toothed wheel to produce the rotary movement of the platen, an electric motor including a motor shaft having one end on which is fixed the worm, a container for housing the electric motor and wherein the worm projects from the container, a pivotable support in which is mounted the container, pivot means disposed parallel to the platen for pivotally mounting the pivotable support, and means for taking-up radial play and axial play for holding the worm engaged with the helicoidally toothed wheel, said means for taking-up radial play and axial play comprising first spring means for pivoting the pivotable support about the pivot means until the worm is fully meshed with the helicoidally toothed wheel to reduce the radial play between the worm and helicoidally toothed wheel and second spring means operative on the worm and on the end of the motor shaft to reduce the axial play between the worm and the container, wherein said container comprises a hollow cylinder having an upper cover and a lower cover, further comprising a bearing including an inner race fixed on the motor shaft and an outer race mounted within the upper cover and wherein said second spring means urge the end of the motor shaft to take up axial play between the two races of said bearing.

5. A line spacing mechanism according to claim 4, wherein the worm comprises a cylindrical seat for the access to said end of the motor shaft and wherein said second spring means operate on said end by means of a ball housed in the cylindrical seat to take up the axial play between the two races of said bearing.

6. A line spacing mechanism for a printing machine comprising a platen having a helicoidally toothed wheel connected coaxially with the platen, a worm engageable with the helicoidally toothed wheel to produce the rotary movement of the platen, an electric motor including a motor shaft having one end on which is fixed the worm, a container for housing the electric motor and wherein the worm projects from the container, a pivotable support in which is mounted the container, pivot means disposed parallel to the platen for pivotally mounting the pivotable support, and means for taking-up radial play and axial play for holding the worm engaged with the helicoidally toothed wheel, said means for taking-up radial play and axial play comprising first spring means for pivoting the pivotable support about the pivot means until the worm is fully meshed with the helicoidally toothed wheel so as to reduce the radial play between the worm and the helicoidally toothed wheel and second spring means operative on the worm and on one end of the motor shaft so as to reduce the axial play between the worm and the container, wherein said first spring means comprise a spring which urges the pivotable support to pivot in the sense forcing the worm into mesh with the helicoidally toothed wheel without radial play between the worm and the helicoidally toothed wheel, wherein the container comprises a hollow cylinder having an upper cover and a lower cover, wherein the worm comprises a cylindrical seat for the access to one end of the motor shaft and wherein the pivotable support comprises a limb having a rounded end and two side projections, wherein said second spring means comprise a ball housed in the cylindrical seat, a blade which bears against the rounded end between the side projections and against the ball and a spring tensioned between the limb and the blade for urging the ball and thus the motor shaft towards the lower cover of said container.

7. A line spacing mechanism for a printing machine comprising a platen having a helicoidally toothed wheel connected coaxially with the platen, a worm engageable with the helicoidally toothed wheel to produce the rotary movement of the platen, an electric motor including a motor shaft which rotates the worm, a coder unit for controlling the angular position of the worm, the motor shaft comprising a first end on which is fixed the worm and a second end on which is fixed the coder unit, wherein the worm is disposed opposite to the coder unit and the electric motor is disposed between the worm and the coder unit, a container for housing the electric motor and the coder unit and wherein the worm projects from the container, a pivotable support in which is mounted the container, pivot means disposed parallel to the platen for pivotally mounting the pivotable support, and means for taking-up radial play and axial play for holding the worm engaged with the helicoidally toothed wheel, said means for taking-up radial play and axial play comprising first spring means for pivoting the pivotable support about the pivot means until the worm is fully meshed with the helicoidally toothed wheel so as to reduce the radial play between the worm and the helicoidally toothed wheel and second spring means operative on the worm and on the first end so as to reduce the axial play between the worm and the container, wherein the coder unit comprises a series of sectors, an optical transducer having a light and a photo detector which are disposed on opposite sides with respect to the path of movements of the sectors, wherein the pitch of the movement of the platen is proportional to the pitch of the series of sectors and wherein the coder unit signals the angular positions reached by the worm of the electric motor.

* * * * *